Patented Aug. 26, 1924.

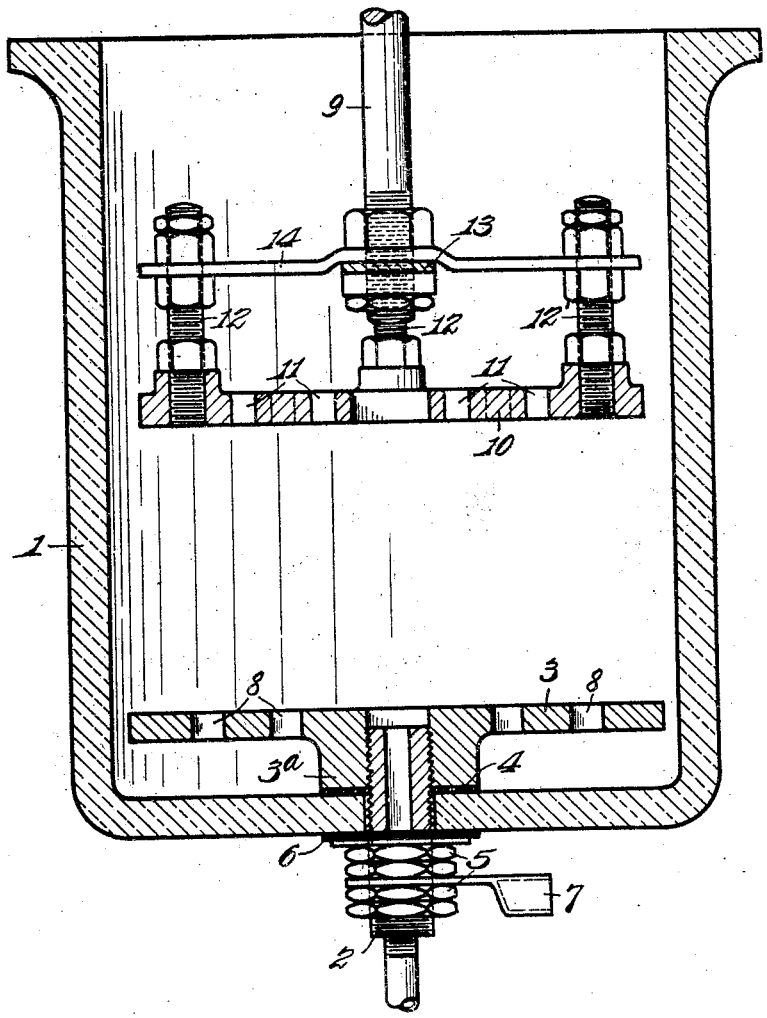

1,506,406

UNITED STATES PATENT OFFICE.

ALBERT E. CARVER, OF BEECH BOTTOM, WEST VIRGINIA, ASSIGNOR OF ONE-HALF TO J. E. MONTGOMERY, OF WHEELING, WEST VIRGINIA.

SLIP REGULATOR FOR ELECTRIC MOTORS.

Application filed June 7, 1922. Serial No. 566,500.

*To all whom it may concern:*

Be it known that I, ALBERT E. CARVER, a citizen of the United States of America, and resident of Beech Bottom, county of Brooke, and State of West Virginia, have invented certain new and useful Improvements in Slip Regulators for Electric Motors, of which the following is a specification.

This invention relates broadly to automatic slip regulators for electric motors of the three-phase type, and more specifically to electrodes for such regulators.

In commerical forms of automatic slip regulators of the type to which the present invention relates it has been a more or less common practice to employ within the insulated cells, which are submerged in a soda-ash solution contained in the regulator tank, a lower stationary plate-like electrode made of cast iron and an upper vertically movable electrode made of a soft steel bar wound into coil-spring form. Electrodes of this character are objectionable for the reason that, submerged in the soda-ash solution, which acts as a current resistance in starting the motor, and separated the maximum distance, they rapidly become corroded to the extent that a very high resistance is offered. This results, first, in the creation of an abnormally high resistance in the rotor circuit of the motor, which prevents the motor from attaining its rated speed; and, secondly, due to such speed reduction, the flywheel energy is inadequate to effectively or duly relieve the motor when a high peak load is imposed thereon.

The object of the present invention is to obviate the objectionable features, above referred to, by the provision, in a slip regulator, of electrodes which are made of a material possessing relatively less current resistance than that formerly employed in electrodes, as aforesaid, and which are so constructed that they are not readily deteriorated by the action of the resistance solution or acid employed.

In describing the invention in detail, reference is herein had to the accompanying drawings, in which—

The figure is a central vertical section of an automatic slip regulator cell and the therein-disposed electrodes embodying my invention.

Referring to said drawing, 1 indicates an insulated earthenware cell of the usual form employed in slip regulators. Mounted stationarily upon a centrally disposed hollow nipple 2 which extends upward through the bottom of said cell is a boss $3^a$ formed on the under side of an electrode 3, said boss supporting said electrode at a suitably spaced distance from the bottom of said cell and being seated upon a rubber gasket 4 whereby a close joint is formed with said cell.

Secured on said nipple 2 below the cell 1 by means of nuts 5 disposed against a rubber sealing washer or washers 6 is a motor circuit terminal 7 through which and the intermediate nipple 2 current is conducted to the electrode 3. Said electrode which is in substantially the form of a flat plate, preferably circular, is made of an acid-resisting bronze metal and has therein a plurality of suitably distributed perforations 8 through which sediment deposited thereon may freely pass when the acid solution contained by the cell 1 is agitated, provision thus being made for maintaining the surface of the electrode clean and free from foreign matter which would otherwise act to lower the efficiency of the electrode.

Suspended within the cell 1 by an adjustable vertically movable rod 9, as ordinarily, is an upper cast bronze electrode 10 comprising a flat plate having perforations 11 therein. Said perforations may be of any appropriate form and may be suitably distributed, the purpose thereof being to reduce the weight of the electrode and still leave a sufficient body of metal of the required diameter to enable the electrode 10 to efficiently perform its function.

Said movable electrode 10 is supported by a plurality of stud bolts 12 carried by the outer ends of crossed bars 13 and 14 which are mounted upon the lower end of the rod 9.

In practice, with the movable upper electrode 10 disposed closely adjacent to the stationary electrode 3, the secondary electric current of the motor passes from the lower electrode to the upper electrode, cutting out from the rotor circuit all resistance and allowing the motor at all times to operate up to its rated speed. When a high peak load is imposed on the motor, the regulator mechanism of which the present device forms a part operates to elevate the upper electrode for cutting in resistance in the rotor circuit to the extent that the speed of the motor is reduced to a point where the flywheel energy just suffices to carry the load over the peak, relieving the motor, following which the movable upper electrode settles back to its running position for allowing the motor to resume operation up to its rated full load speed.

The bronze metal herein referred to as employed in the electrodes 3 and 10 may be any kind of bronze, preferably a bronze alloy which is highly resistant to corrosion when submerged in soda-ash solutions and which is readily conductive of electric current. It will therefore be understood that, as used in the appended claims, the term "corrosion-resisting metal" contemplates metals or alloys which are both readily conductive of electricity and highly resistant to corrosion from contact with soda-ash solutions. Also, as used in claim 3, the term "bronze" refers to any alloy bronze metal possessing corrosion-resisting characteristics.

What is claimed is—

1. In an automatic slip regulator for electric motors, the combination with a regulator-tank cell, of a lower stationary electrode disposed in an elevated position with respect to the bottom of said cell, and an upper electrode suspended and vertically movable with respect to said lower electrode, said electrodes being cast in flat plate-like form of corrosion-resisting metal and being suitably perforated.

2. In an automatic slip regulator for electric motors, the combination with a regulator-tank cell, of a lower stationary electrode disposed in an elevated position with respect to the bottom of said cell, and an upper electrode suspended and vertically movable with respect to said lower electrode, each of said electrodes consisting of a one-piece casting of corrosion-resisting metal and having drainage openings therein.

3. In an automatic slip regulator for electric motors, the combination with a regulator-tank cell, of a lower plate-like electrode having a central downwardly-extending boss seated upon the bottom of said cell, and an upper plate-like electrode suspended within said cell and adapted for vertical movement with respect to the lower electrode, each of said electrodes consisting of a one-piece bronze casting having perforations therein.

In testimony whereof, I affix my signature in presence of two subscribing witnesses.

ALBERT E. CARVER.

Witnesses:
  M. T. MANION,
  H. E. DUNLAP.